(12) United States Patent
Giametta

(10) Patent No.: US 10,028,628 B1
(45) Date of Patent: *Jul. 24, 2018

(54) CONCEALED TOILET IN VEHICLES

(71) Applicant: Joseph Anthony Giametta, D'Iberville, MS (US)

(72) Inventor: Joseph Anthony Giametta, D'Iberville, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,398

(22) Filed: Jun. 26, 2017

Related U.S. Application Data

(63) Continuation of application No. 15/406,671, filed on Jan. 14, 2017, now Pat. No. 9,730,563.

(51) Int. Cl.
| | |
|---|---|
| *B60R 15/04* | (2006.01) |
| *A47K 11/04* | (2006.01) |
| *A47K 11/10* | (2006.01) |
| *A47K 13/24* | (2006.01) |
| *A47K 13/06* | (2006.01) |
| *A47K 13/02* | (2006.01) |
| *B60N 2/44* | (2006.01) |
| *B60N 2/90* | (2018.01) |

(52) U.S. Cl.
CPC ............ *A47K 11/04* (2013.01); *A47K 11/105* (2013.01); *A47K 13/02* (2013.01); *A47K 13/06* (2013.01); *A47K 13/242* (2013.01); *B60N 2/44* (2013.01); *B60N 2/90* (2018.02); *B60R 15/04* (2013.01)

(58) Field of Classification Search
CPC ........ A47K 11/04; A47K 11/02; A47K 13/14; B60N 2/44
USPC .......................................... 4/458; 220/495.01
See application file for complete search history.

*Primary Examiner* — Christine Skubinna
(74) *Attorney, Agent, or Firm* — Ash Tankha; Lipton, Weinberger & Husick

(57) ABSTRACT

A concealed toilet in a vehicle includes a flexible container, a foundation member, a primary toilet seat member, lock hook assemblies, and a toilet seat cover. The flexible container with a waste containment bag is positioned in a cavity in a vehicle seat. The foundation member, attached to the flexible container, secures the flexible container to a seat brace of the vehicle seat. The foundation member includes bag holders and an elevated bag diverter for holding and diverting an upper portion of the waste containment bag respectively. The primary toilet seat member includes a tapered guide stud engageable with the elevated bag diverter. The lock hook assemblies lock with lock posts of the primary toilet seat member for securing the primary toilet seat member to the foundation member. The toilet seat cover with a concealment layer is positioned on the primary toilet seat member for concealing the waste containment bag.

10 Claims, 18 Drawing Sheets

CONCEALED TOILET IN VEHICLES

CROSS REFERENCE TO RELATED APPLICATIONS

This application is a continuation application of non-provisional patent application Ser. No. 15/406,671, titled "Concealed Toilet In Vehicles", filed Jan. 14, 2017 in the United States Patent and Trademark Office. The specification of the above referenced application is incorporated herein by reference in its entirety.

BACKGROUND

A frequently encountered problem while travelling in a vehicle is an unavailability of a toilet. Travellers have to make frequent breaks in the course of their journey and leave their vehicles to find public restrooms or set up portable toilets at inconvenient locations. Travellers may not find restrooms during their journey in sparsely populated areas or desolate places. Moreover, public restrooms, if available, are often unclean and unhygienic and most individuals would be averse to using these public restrooms. Furthermore, children may find it difficult to use public restrooms or portable toilets as public toilets or portable toilets are typically not customized to accommodate children.

Portable toilets currently in use have complex assemblies and are heavy and bulky which make the portable toilets difficult to carry. Moreover, these portable toilets are difficult to position and accommodate in a vehicle due to lack of space in the vehicle. Also, these portable toilets do not provide privacy to users during use. Furthermore, because most conventional toilets require plumbing and sanitation assemblies to flush out sanitary waste, portable toilets cannot be connected to such plumbing in a vehicle due to lack of space in the vehicle. Furthermore, due to their construction, portable toilets and toilets with complex plumbing and sanitation assemblies typically leak and create unhygienic conditions in the location where these toilets are installed.

Hence, there is a long felt need for a portable, leak proof, hygienic and concealed toilet with minimal space requirements and with no complex plumbing and sanitation assemblies, that can be installed below a seat of a vehicle and used privately in the vehicle, without requiring a user to leave the vehicle. Furthermore, there is a need for a portable toilet that can be customized for use by a child user.

SUMMARY OF THE INVENTION

This summary is provided to introduce a selection of concepts in a simplified form that are further disclosed in the detailed description of the invention. This summary is not intended to determine the scope of the claimed subject matter.

The apparatus disclosed herein addresses the above recited need for a portable, leak proof, hygienic and concealed toilet with minimal space requirements and with no complex plumbing and sanitation assemblies, that can be installed below a vehicle seat and used privately in a vehicle, without requiring a user to leave the vehicle. The concealed toilet disclosed herein is attachable to a vehicle seat and can be customized for use by a child user. The concealed toilet disclosed herein comprises a flexible container, multiple bag fasteners, a foundation member, a primary toilet seat member, lock hook assemblies, and a toilet seat cover. The flexible container is positioned in a cavity in the vehicle seat. The flexible container is provided with a waste containment bag accommodated within a space defined within the flexible container. The bag fasteners are fixed at predetermined locations on the inner surfaces of the flexible container for securing the waste containment bag to the inner surfaces of the flexible container within the space of the flexible container.

The foundation member is attached to and protrudes from an upper end of the flexible container for securing the flexible container to a seat brace of the vehicle. The foundation member comprises multiple bag holders, an elevated bag diverter, and mounting holes. The bag holders extend outwardly from opposing sides of the foundation member for holding an upper portion of the waste containment bag that extends over the opposing sides of the foundation member. The elevated bag diverter extends from an upper surface of the foundation member for diverting the upper portion of the waste containment bag for preventing rupture of the waste containment bag. The mounting holes are positioned on the upper surface of the foundation member for accommodating fastening elements that secure the foundation member to the seat brace. The foundation member further comprises a tapered inner periphery for receiving and mating with a tapered inner periphery of the primary toilet seat member.

The primary toilet seat member is detachably attached to the upper surface of the foundation member. The tapered inner periphery of the primary toilet seat member allows positioning of the toilet seat cover or, in an embodiment, a secondary toilet seat member for use by a child user into the primary toilet seat member. The primary toilet seat member comprises a tapered guide stud and lock posts. The tapered guide stud extends downwardly from a lower surface of the primary toilet seat member for engaging with a hole defined in the elevated bag diverter of the foundation member. The lock posts extend outwardly from opposing sides of the primary toilet seat member. The lock hook assemblies are fixedly attached to the opposing sides of the foundation member. Each of the lock hook assemblies comprises a support structure, a pipe, and a spring. The support structure is fixedly attached to a corresponding one of the opposing sides of the foundation member. The pipe is fixedly attached to the support structure. The spring is accommodated in a space defined within the pipe. The spring comprises a lock post hook extending from an upper end of the spring. The lock post hook engages with one of the lock posts of the primary toilet seat member for securing the primary toilet seat member to the foundation member. A lower end of the spring is connected to the support structure. The toilet seat cover comprises a concealment layer positioned on the primary toilet seat member for concealing the waste containment bag in the flexible container. The toilet seat cover further comprises a tapered member extending downwardly from a lower surface of the concealment layer to mate with and fit into the tapered inner periphery of the primary toilet seat member.

In an embodiment, the concealed toilet disclosed herein further comprises a secondary toilet seat member positioned within an opening defined by the primary toilet seat member, for use by a child user on removal of the toilet seat cover from the primary toilet seat member. The secondary toilet seat member comprises a base plate and a sleeve. The base plate with a tapered outer periphery securely fits within the tapered inner periphery of the primary toilet seat member. The sleeve comprises an opening extending upwardly from an upper surface of the base plate for receiving sanitary waste from the child user. The opening of the sleeve of the secondary toilet seat member is in fluid communication with the waste containment bag in the space defined within the flexible container for transferring the sanitary waste from the child user to the waste containment bag.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific structures disclosed herein. The description of a structure referenced by a numeral in a drawing is applicable to the description of that structure shown by that same numeral in any subsequent drawing herein.

DETAILED DESCRIPTION OF THE INVENTION

Figure 1A:
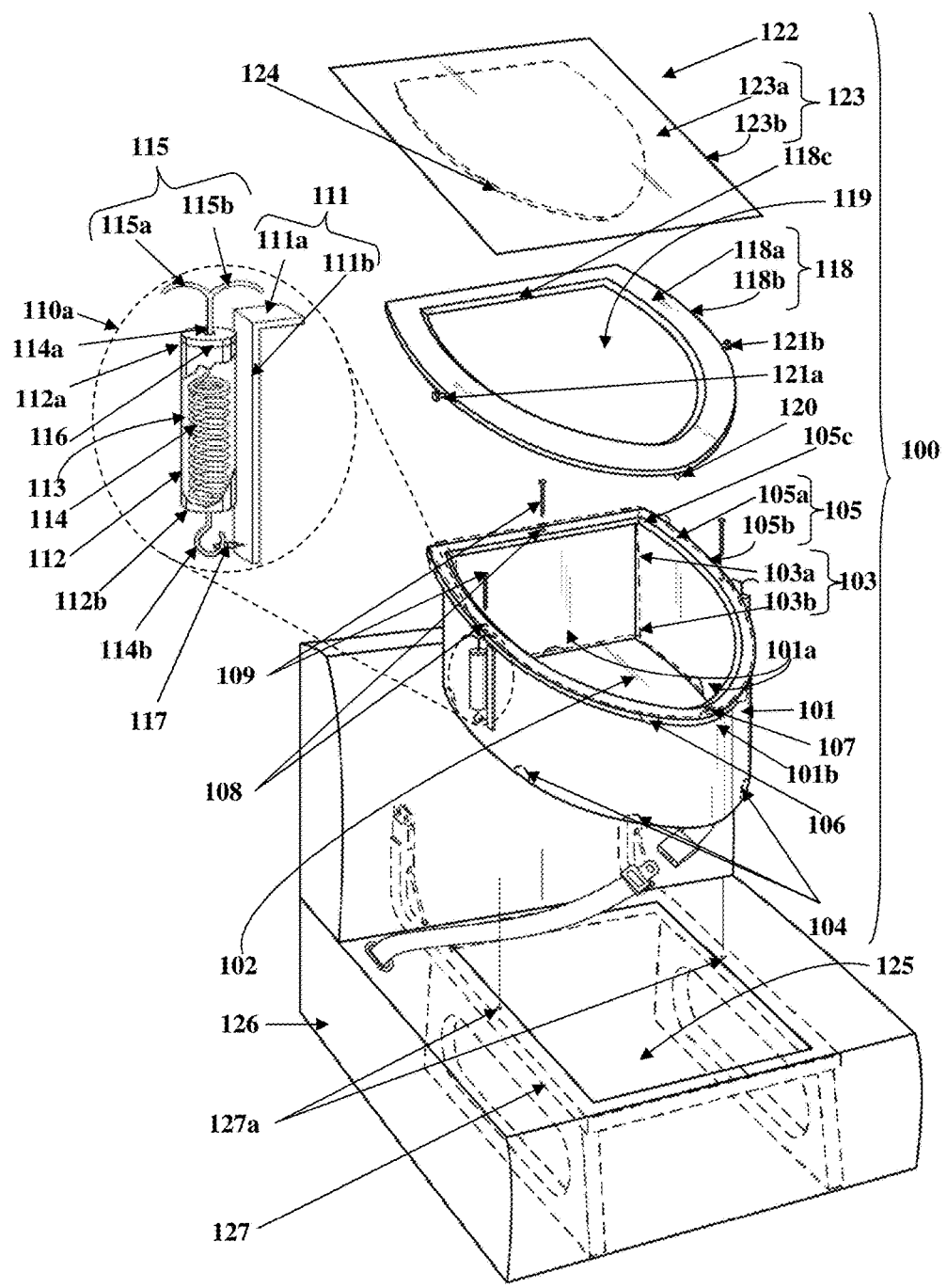
FIG. 1A exemplarily illustrates an exploded isometric view of a concealed toilet in a vehicle seat.
Figure 1B:
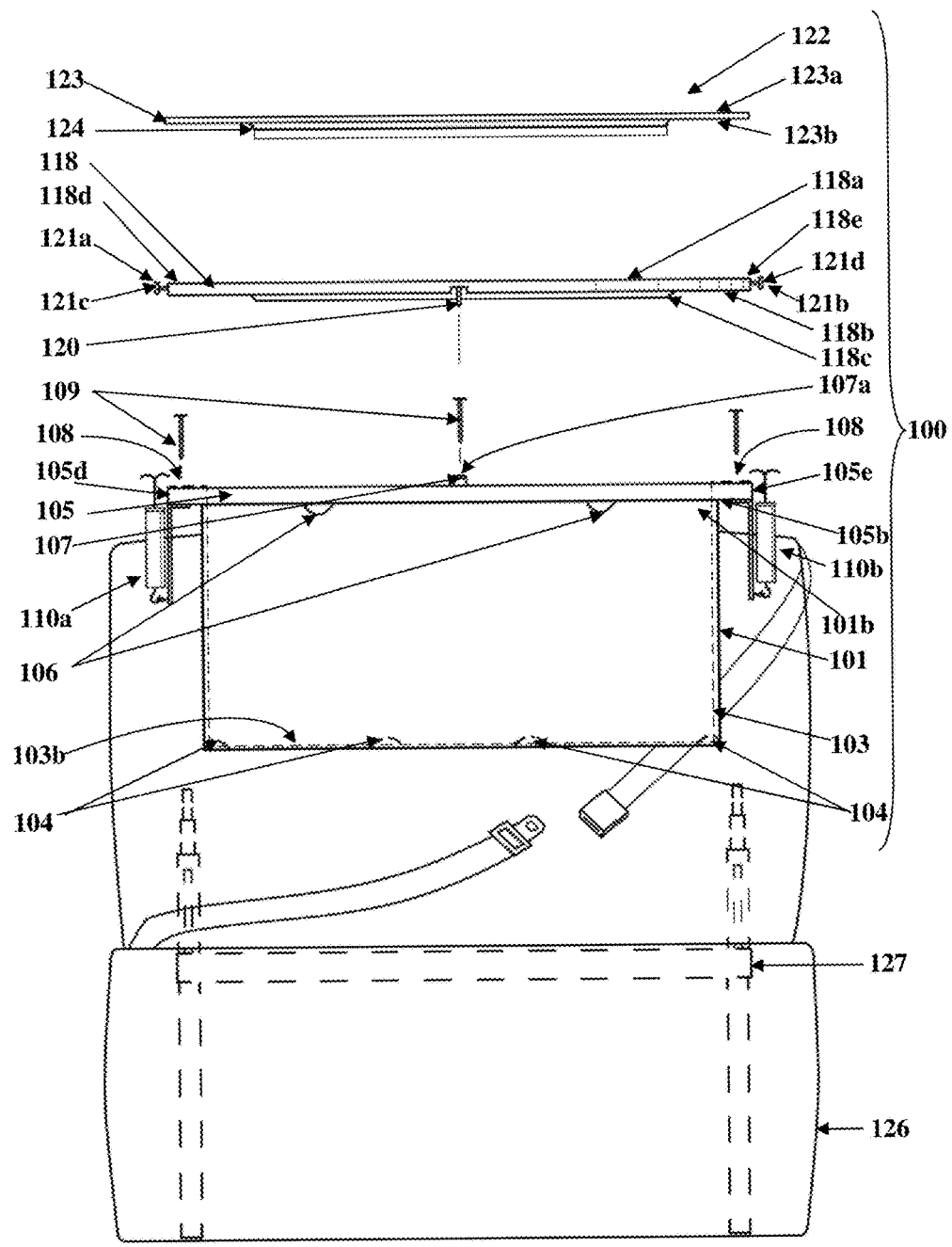
FIG. 1B exemplarily illustrates an exploded front elevation view of the concealed toilet in a vehicle seat.

FIGS. 1A-1B exemplarily illustrate an exploded isometric view and an exploded front elevation view of a concealed toilet 100 in a vehicle seat 126. The concealed toilet 100 is attachable to a seat brace 127 of the vehicle seat 126 in a vehicle (not shown). The concealed toilet 100 is a waterless toilet positioned below the vehicle seat 126. The concealed toilet 100 comprises a flexible container 101, multiple bag fasteners 104, a foundation member 105, a primary toilet seat member 118, lock hook assemblies 110a and 110b, and a toilet seat cover 122 as exemplarily illustrated in FIGS. 1A-1B.

The flexible container 101 is positioned in a cavity 125 in the vehicle seat 126. The flexible container 101 is, for example, made of plastic, rubber, silicone, or any other flexible material. The flexible container 101 accommodates a waste containment bag 103 within a space 102 defined within the flexible container 101 as exemplarily illustrated in FIG. 1A. The waste containment bag 103 is indicated using dashed lines in FIGS. 1A-2E. The waste containment bag 103 is made of, for example, plastic, polythene, rubber, nylon, polyester, synthetics, etc., and used for collecting sanitary waste from a user, for example, an adult user, a child user, etc. The waste containment bag 103 is stretchable and can be expanded to increase the size of the waste containment bag 103. The waste containment bag 103 accommodated in the flexible container 101 is leak proof and odor proof. In an embodiment, the waste containment bag 103 comprises a draw string (not shown) that is pulled to close the waste containment bag 103 for disposal.

The bag fasteners 104 are fixed at predetermined locations on inner surfaces 101a of the flexible container 101 as exemplarily illustrated in FIG. 1A, for securing a lower portion 103b of the waste containment bag 103 to the inner surfaces 101a of the flexible container 101 within the space 102 of the flexible container 101. The bag fasteners 104 are made, for example, from metals, plastics, composites, etc. In an embodiment, the bag fasteners 104 are clips with a length of, for example, about 0.75 inches and a width of about 0.75 inches, and with rounded edges having a width of about 0.125 inches from the top tapering to 0 inches at the bottom. In another embodiment, the bag fasteners 104 are one of adhesives, hook and loop fasteners such as Velcro® of Velcro Industries B. V. LLC, fastening tapes, etc., that can be used for securing the waste containment bag 103 to the inner surfaces 101a of the flexible container 101. In another embodiment, the bag fasteners 104 are clips integral to the inner surfaces 101a of the flexible container 101 for securing the lower portion 103b of the waste containment bag 103 to the inner surfaces 101a of the flexible container 101 within the space 102 of the flexible container 101.

The foundation member 105 is attached to and protrudes laterally from an upper end 101b of the flexible container 101 for securing the flexible container 101 to the seat brace 127 of the vehicle seat 126. In an embodiment, a clearance of about 0.5 inches is provided between the foundation member 105 and the vehicle seat 126 in the vehicle. The seat brace 127 is a metal framework positioned in substantially the same angle and orientation as the vehicle seat 126 to mount the vehicle seat 126 to the seat brace 127. The seat brace 127 of the vehicle seat 126 is modified to accommodate the concealed toilet 100 in the cavity 125 in the vehicle seat 126. The seat brace 127 is in substantially the same slope as the vehicle seat 126. The seat brace 127 comprises holes 127a for accommodating fastening elements 109 that secure the foundation member 105 to the seat brace 127 of the vehicle seat 126. The foundation member 105 is a metal framework that provides a firm foundation to the concealed toilet 100 in the vehicle seat 126. In an embodiment, the foundation member 105 is made of substantially the same metal framework as that of the seat brace 127 of the vehicle seat 126. The foundation member 105 is, for example, made from hard durable materials such as metals, plastic, composites, etc.

The foundation member 105 comprises mounting holes 108 positioned on an upper surface 105a of the foundation member 105 as exemplarily illustrated in FIG. 1A. The mounting holes 108 of the foundation member 105 accommodate the fastening elements 109 that secure the foundation member 105 to the seat brace 127 of the vehicle seat 126. The fastening elements 109 are, for example, rivets, screws, bolts, etc. In an embodiment, the foundation member 105 is welded to the seat brace 127 of the vehicle seat 126. The foundation member 105 further comprises a tapered inner periphery 105c for receiving and mating with a tapered inner periphery 118c of the primary toilet seat member 118. The tapered inner periphery 105c of the foundation member 105 matches with the tapered inner periphery 118c of the primary toilet seat member 118 to allow the primary toilet seat member 118 to be positioned and fit into the foundation member 105. The tapered inner periphery 105c of the foundation member 105 is angled, for example, at 45° with respect to the upper surface 105a of the foundation member 105 and has a thickness of, for example, about 0.25 inches, for proper positioning and fitting of the primary toilet seat member 118 on the foundation member 105 as exemplarily illustrated in FIGS. 2C-2D. The foundation member 105 with the tapered inner periphery 105c is, for example, about 0.5 inches thick.

The foundation member 105 further comprises multiple bag holders 106 extending outwardly from opposing sides 105d and 105e of the foundation member 105. The bag holders 106 hold an upper portion 103a of the waste containment bag 103 exemplarily illustrated in FIG. 1A, that extends over the opposing sides 105d and 105e of the foundation member 105. The bag holders 106 are, for example, made of plastic, metal, etc. The diameter of the bag holders 106 is, for example, about 0.25 inches. The thickness of the bag holders 106 is, for example, about 0.0625 inches. In an embodiment, the bag holders 106 are an extension of the foundation member 105 and made of substantially the same material as that of the foundation member 105. The foundation member 105 further comprises an elevated bag diverter 107 extending from the upper surface 105a of the foundation member 105 for diverting the upper portion 103a of the waste containment bag 103 for preventing rupture of the waste containment bag 103. In an embodiment, the elevated bag diverter 107 is a cylindrical projection extending upwardly from the upper surface 105a of the foundation member 105. The height of the elevated bag diverter 107 is, for example, about 0.25 inches. The elevated bag diverter 107 is, for example, made of plastic. In an embodiment, the elevated bag diverter 107 is made of substantially the same material as the foundation member 105, for example, hard durable materials such as metals, plastic, composites, etc.

The primary toilet seat member 118 is detachably attached to the upper surface 105a of the foundation member 105. The primary toilet seat member 118 comprises a tapered guide stud 120 and lock posts 121a and 121b. The tapered guide stud 120 is a fastening element that extends downwardly from a lower surface 118b of the primary toilet seat member 118. The length of the tapered guide stud 120 is, for example, about 0.375 inches. The diameter of the tapered guide stud 120 is, for example, about 0.25 inches. The tapered guide stud 120 engages with a hole 107a defined in the elevated bag diverter 107 of the foundation member 105 exemplarily illustrated in FIG. 1B. The lock posts 121a and 121b extend outwardly from opposing sides 118d and 118e of the primary toilet seat member 118 respectively. In an embodiment, the lock posts 121a and 121b are cylindrical projections with enlarged circular ends 121c and 121d respectively, as exemplarily illustrated in FIG. 1B. In another embodiment, the lock posts 121a and 121b comprise enlarged ends of any other geometrical shape, for example, a square shape, a triangular shape, etc. The length of each of the lock posts 121a and 121b is, for example, about 0.25 inches. The thickness of each of the lock posts 121a and 121b is, for example, about 0.125 inches. The diameter of each of the enlarged circular ends 121c and 121d of the lock posts 121a and 121b respectively is, for example, about 0.0625 inches. The length of the lock posts 121a and 121b is configured to maintain a pressure exerted by springs 114 in the lock hook assemblies 110a and 110b on the primary toilet seat member 118.

The primary toilet seat member 118 further comprises a tapered inner periphery 118c angled, for example, at 45° with respect to the upper surface 118a of the primary toilet seat member 118. The tapered inner periphery 118c of the primary toilet seat member 118 fits into the 45° tapered inner periphery 105c of the foundation member 105. The thicknesses of the primary toilet seat member 118 and the 45° tapered inner periphery 118c of the primary toilet seat member 118 are, for example, about 0.5 inches and 0.25 inches respectively. The tapered inner periphery 118c of the primary toilet seat member 118 further matches with a tapered member 124 of the toilet seat cover 122 exemplarily illustrated in FIG. 1B, for receiving and mating with the tapered member 124 of the toilet seat cover 122. The primary toilet seat member 118 is made of, for example, plastic, composites, metal, etc.

The lock hook assemblies 110a and 110b are fixedly attached to the opposing sides 105d and 105e of the foundation member 105 respectively, as exemplarily illustrated in FIG. 1B, for example, using screws, bolts, rivets, etc. In an embodiment, the lock hook assemblies 110a and 110b are molded together with the foundation member 105. Each of the lock hook assemblies 110a and 110b comprises a support structure 111, a pipe 112, and a spring 114. An enlarged cutaway view of one lock hook assembly 110a showing the support structure 111, the pipe 112, and the spring 114 is exemplarily illustrated in FIG. 1A. Similar to the lock hook assembly 110a fixedly attached to one opposing side 105d of the foundation member 105, the lock hook assembly 110b comprising a corresponding support structure 111, pipe 112 and spring 114 is fixedly attached to the other opposing side 105e of the foundation member 105. The support structure 111 is fixedly attached to the opposing side 105d of the foundation member 105. In an embodiment, the support structure 111 is a 90° angle bracket or an L bracket glued, or welded, or fixed using screws, bolts, rivets, etc., to the opposing side 105d of the foundation member 105.

As exemplarily illustrated in the enlarged cutaway view of FIG. 1A, the support structure 111 of the lock hook assembly 110a comprises a short arm 111a and a long arm 111b perpendicular to each other. The short arm 111a of the support structure 111 is fixed to the lower surface 105b of the foundation member 105, for example, using screws, bolts, rivets, etc. In an embodiment, the short arm 111a of the support structure 111 is welded to the lower surface 105b of the foundation member 105. The support structure 111 supports the pipe 112 and the spring 114 against the foundation member 105. The support structure 111 is, for example, made from metal, plastic, composites, etc. The pipe 112 of the lock hook assembly 110a is fixedly attached to the long arm 111b of the support structure 111. In an embodiment, the pipe 112 and the support structure 111 of the lock hook assembly 110a are molded together and attached to the foundation member 105. In another embodiment, the pipe 112 is welded to the long arm 111b of the support structure 111. The pipe 112 is a hollow metal pipe with a space 113 defined within the pipe 112. The diameter of the pipe 112 is, for example, about 0.25 inches. The pipe 112 is, for example, made of metal, plastic, composites, etc.

The spring 114 of the lock hook assembly 110a is accommodated in the space 113 defined within the pipe 112. The spring 114 is a wire, for example, made of steel, alloy steel, metal composites, etc. The spring 114 comprises at least two hooks 115 extending from an upper end 114a of the spring 114 as exemplarily illustrated in FIG. 1A. The hooks 115 are welded to the upper end 114a of the spring 114. In an embodiment, the hooks 115 are soldered to the upper end 114a of the spring 114. The hooks 115 comprise a lock post hook 115a extending from the upper end 114a of the spring 114. The lock post hook 115a of each of the lock hook assemblies 110a and 110b engages with each of the lock posts 121a and 121b of the primary toilet seat member 118 respectively, for securing the primary toilet seat member 118 to the foundation member 105. The hooks 115 further comprise a finger hook 115b extending from the upper end 114a of the spring 114. The finger hook 115b facilitates engagement of the lock post hook 115a with the lock post 121a of the primary toilet seat member 118. Similarly, the finger hook 115b of the lock hook assembly 110b facilitates engagement of the lock post hook 115a with the lock post 121b of the primary toilet seat member 118. In an embodiment, the hooks 115 are made of substantially the same material as the spring 114. The hooks 115 are, for example, made of steel, alloy steel, metal composites, etc.

A lower end 114b of the spring 114 is connected to the support structure 111 of the lock hook assembly 110a, for example, using a ring element 117 attached to the long arm 111b of the support structure 111 as exemplarily illustrated in FIG. 1A. The lower end 114b of the spring 114 is bent and hooked into the ring element 117 extending from the long arm 111b of the support structure 111. The ring element 117 is fixed to the long arm 111b of the support structure 111, for example, about 0.5 inches below a lower end 112b of the pipe 112. In an embodiment, the ring element 117 is made of substantially the same material as the spring 114. The ring element 117 is, for example, made of steel, alloy steel, metal composites, etc. In an embodiment, the lower end 114b of the spring 114 is directly fixed to the long arm 111b of the support structure 111. In another embodiment, the lower end 114b of the spring 114 is soldered to the long arm 111b of the support structure 111.

Each of the lock hook assemblies 110a and 110b further comprises a spring stop 116 positioned on an upper end 112a of the pipe 112 for precluding the spring 114 from extending outwards of the pipe 112. The spring stop 116 resists tension developed in the spring 114 when the spring 114 is pulled by the finger hook 115b to facilitate locking of the foundation member 105 to the lock post 121a of the primary toilet seat member 118 using the lock post hook 115a. Similarly, the spring stop 116 of the lock hook assembly 110b resists tension developed in the spring 114 of the lock hook assembly 110b when the spring 114 is pulled by the finger hook 115b to facilitate locking of the foundation member 105 to the lock post 121b of the primary toilet seat member 118 using the lock post hook 115a of the lock hook assembly 110b. In an embodiment, a clearance of 0.0625 inches is provided between the foundation member 105 and the pipe 112 of each of the lock hook assemblies 110a and 110b to prevent the rupture of the waste containment bag 103 that extends over the opposing sides 105d and 105e of the foundation member 105 by avoiding contact between the waste containment bag 103 and the lock hook assemblies 110a and 110b respectively.

The toilet seat cover 122 comprises a concealment layer 123 positioned on the primary toilet seat member 118 for concealing the waste containment bag 103 in the flexible container 101. As exemplarily illustrated in FIG. 1B, the toilet seat cover 122 further comprises a tapered member 124 extending downwardly from a lower surface 123b of the concealment layer 123 to mate with and fit into the 45° angled tapered inner periphery 118c of the primary toilet seat member 118. The tapered member 124 of the toilet seat cover 122 extends, for example, about 0.25 inches from the concealment layer 123 to about 0.5 inches in a downward direction and fits into the opening 119 of the primary toilet seat member 118 for sealing the primary toilet seat member 118. The thickness of the concealment layer 123 is, for example, about 0.0625 inches and the thickness of the tapered member 124 is, for example, about 0.75 inches. The tapered inner periphery 118c of the primary toilet seat member 118 matches the tapered member 124 of the toilet seat cover 122 to allow the toilet seat cover 122 to be positioned and fit into the primary toilet seat member 118. The 0.25 inch taper of the toilet seat cover 122 mates with the 0.25 inch taper in the primary toilet seat member 118 for fitting the toilet seat cover 122 into the primary toilet seat member 118. The additional 0.5 inch extension of the tapered member 124 of the toilet seat cover 122 matches the offset in the primary toilet seat member 118. In an embodiment, the material of the concealment layer 123 is substantially the same as that of the vehicle seat 126. In another embodiment, the material of the concealment layer 123 is different from the vehicle seat 126. The concealment layer 123 is, for example, made of polyester, nylon, leather, rubber such as neoprene, vinyl, canvas, suede, etc.

Figure 2A:
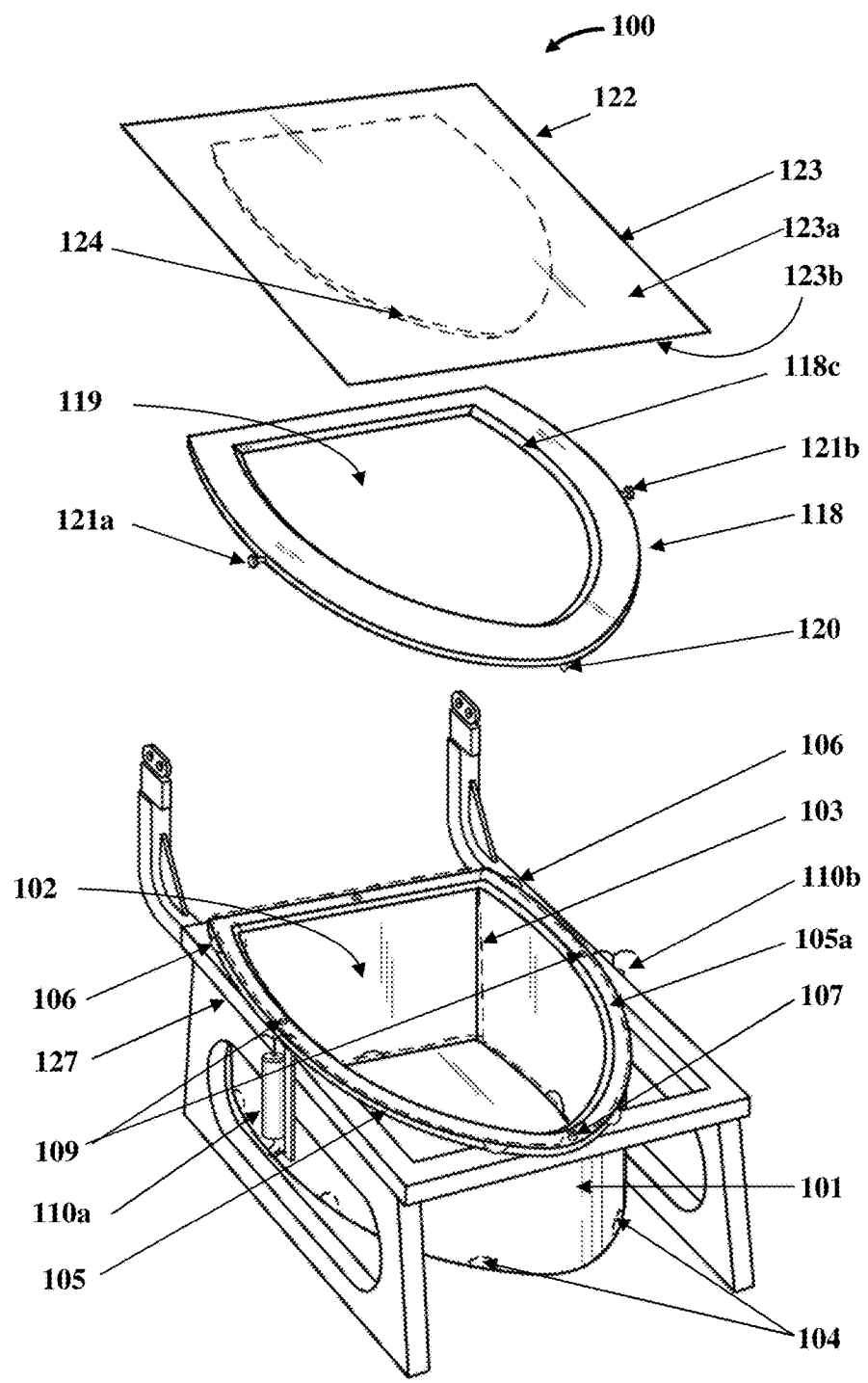
FIG. 2A exemplarily illustrates a partial disassembled isometric view of the concealed toilet, showing a foundation member along with a flexible container of the concealed toilet fixed to a seat brace of a vehicle seat.
Figure 2B:
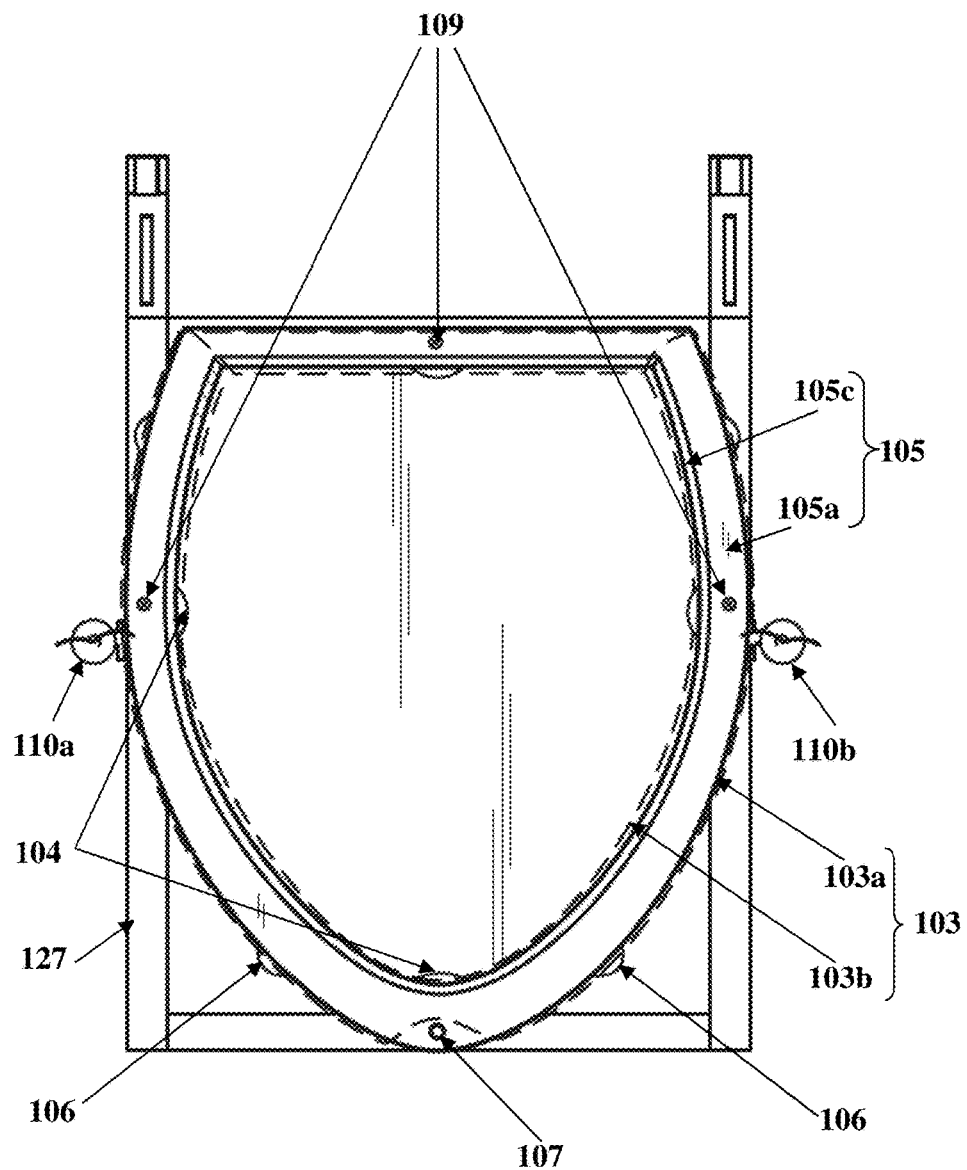
FIG. 2B exemplarily illustrates a partial top plan view of the concealed toilet, showing the foundation member fixed to the seat brace.

FIGS. 2A-2G exemplarily illustrate a sequential assembly of the concealed toilet 100 in a vehicle seat 126 exemplarily illustrated in FIGS. 2D-2G. As exemplarily illustrated in FIG. 2A, the foundation member 105 along with the flexible container 101 is fixed to the seat brace 127 using the fastening elements 109. FIG. 2A exemplarily illustrates a partial disassembled isometric view of the concealed toilet 100, showing the foundation member 105 along with the flexible container 101 fixed to the seat brace 127. FIG. 2B exemplarily illustrates a partial top plan view of the concealed toilet 100, showing the foundation member 105 fixed to the seat brace 127. The fastening elements 109 are screwed into the mounting holes 108 positioned on the upper surface 105a of the foundation member 105 and into the holes 127a positioned on the seat brace 127 of the vehicle seat 126 to fasten the foundation member 105 to the seat brace 127. The fixing of the foundation member 105 to the seat brace 127 provides a foundation for the concealed toilet 100 in the vehicle seat 126.

Figure 2C:
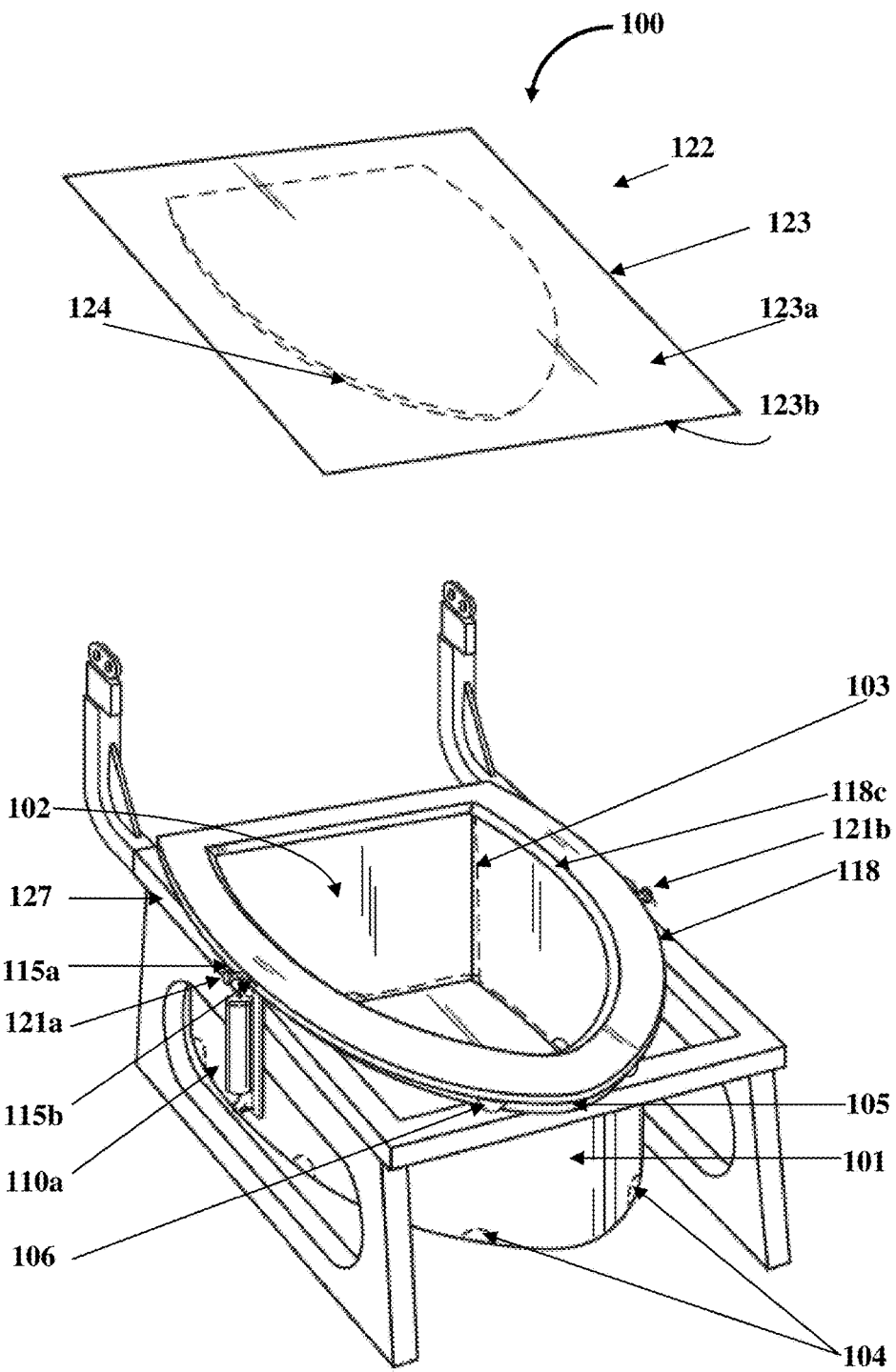
FIG. 2C exemplarily illustrates a partial disassembled isometric view of the concealed toilet, showing a primary toilet seat member attached to the foundation member.
Figure 2D:
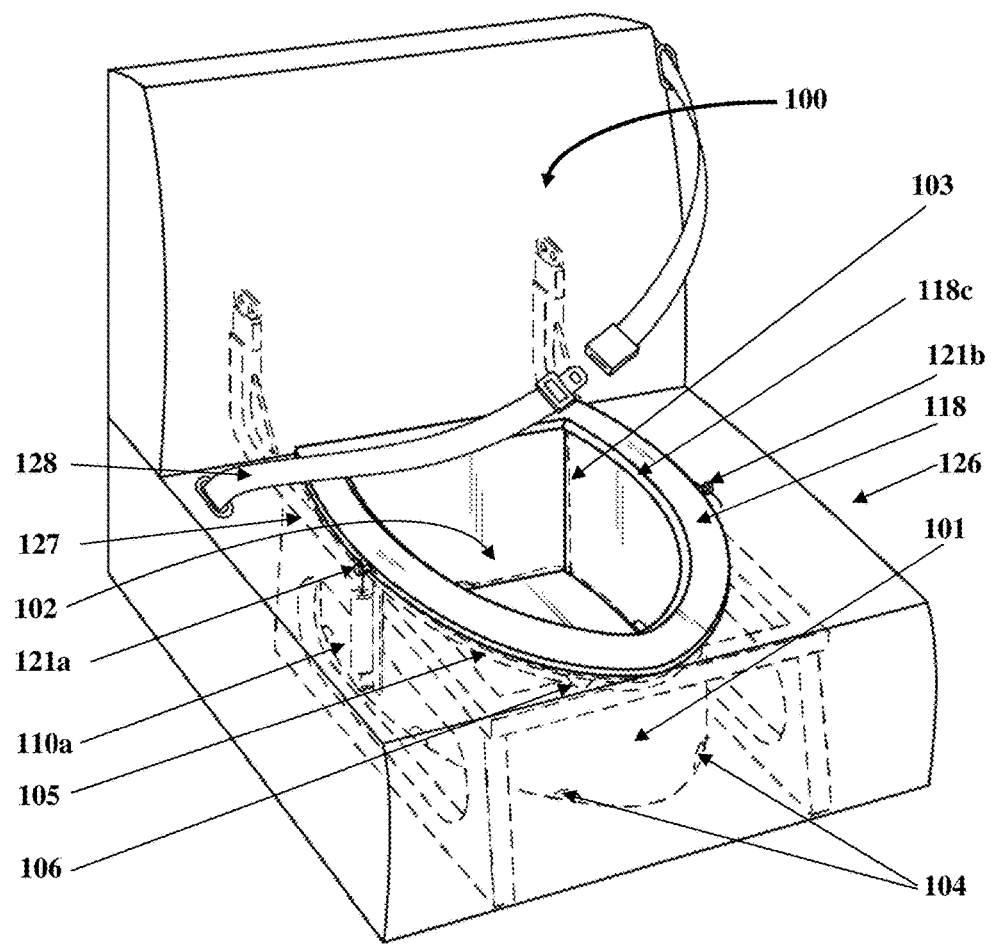
FIG. 2D exemplarily illustrates a partial disassembled isometric view of the concealed toilet in a vehicle seat, showing positioning of the foundation member along with the flexible container and the primary toilet seat member in the vehicle seat.

Once the foundation member 105 is fixed to the seat brace 127 of the vehicle seat 126, the primary toilet seat member 118 exemplarily illustrated in FIG. 2A, is positioned on the foundation member 105 and detachably attached to the upper surface 105a of the foundation member 105 using the lock hook assemblies 110a and 110b as exemplarily illustrated in FIG. 2C. FIG. 2C exemplarily illustrates a partial disassembled isometric view of the concealed toilet 100, showing the primary toilet seat member 118 attached to the foundation member 105. The tapered guide stud 120 of the primary toilet seat member 118 is inserted into the hole 107a of the elevated bag diverter 107 exemplarily illustrated in FIG. 1B, extending from the upper surface 105a of the foundation member 105. The insertion of the tapered guide stud 120 into the hole 107a of the elevated bag diverter 107 prevents the contact of the tapered guide stud 120 with the waste containment bag 103 for preventing the rupture of the waste containment bag 103. The spring 114 exemplarily illustrated in FIG. 1A, of each of the lock hook assemblies 110a and 110b is pulled using the finger hook 115b exemplarily illustrated in FIG. 2F. The lock post hook 115a exemplarily illustrated in FIG. 2F, of each of the lock hook assemblies 110a and 110b exemplarily illustrated in FIG. 1A, is hooked to the lock posts 121a and 121b of the primary toilet seat member 118 respectively, to attach the primary toilet seat member 118 to the foundation member 105. Pulling of the spring 114 using the finger hook 115b results in generation of tension in the spring 114 since the lower end 114b of the spring 114 is constrained to the ring element 117 fixed to the long arm 111b of the support structure 111 exemplarily illustrated in FIG. 1A. The spring stop 116 in the pipe 112 exemplarily illustrated in FIG. 1A, resists the tension developed in the spring 114 and retains the spring 114 within the pipe 112 of each of the lock hook assemblies 110a and 110b. In addition to the tension in the spring 114, the enlarged circular ends 121c and 121d of the lock posts 121a and 121b respectively, prevent the unhooking of the lock post hooks 115a from the lock posts 121a and 121b of the primary toilet seat member 118 respectively. In an embodiment, the finger hook 115b and the lock post hook 115a are interchanged. FIG. 2D exemplarily illustrates a partial disassembled isometric view of the concealed toilet 100 in the vehicle seat 126, showing positioning of the foundation member 105 along with the flexible container 101 and the primary toilet seat member 118 in the vehicle seat 126.

Figure 2E:
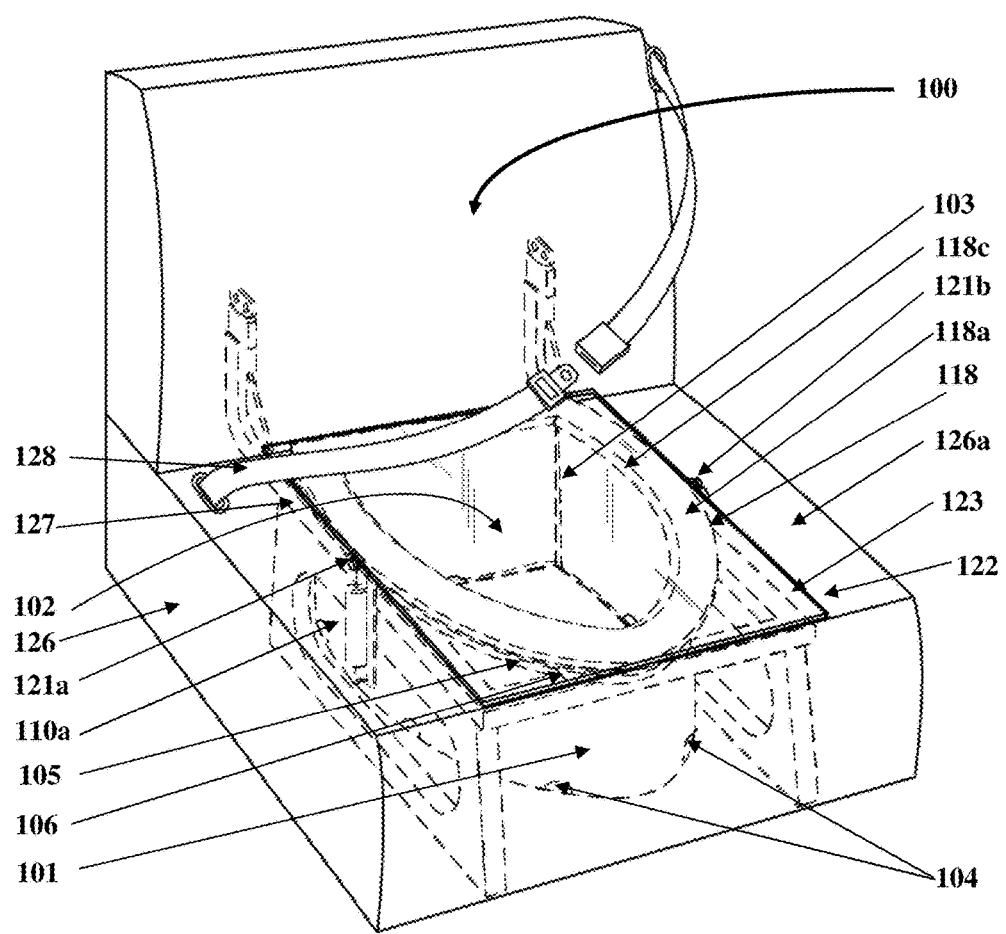
FIG. 2E exemplarily illustrates an assembled isometric view of the concealed toilet in a vehicle seat, showing a toilet seat cover positioned on the vehicle seat to conceal the foundation member along with the flexible container and the primary toilet seat member in the vehicle seat.
Figure 2F:
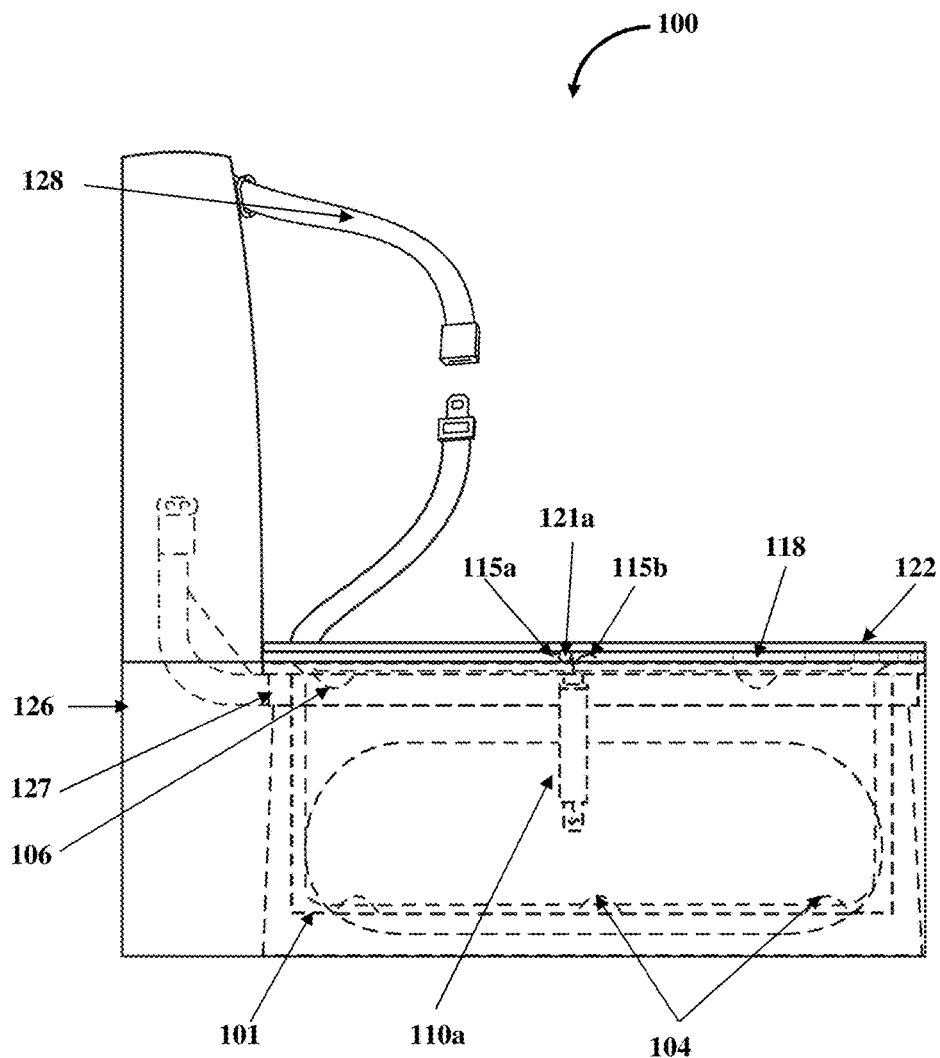
FIG. 2F exemplarily illustrates an assembled left side elevation view of the concealed toilet in a vehicle seat.
Figure 2G:
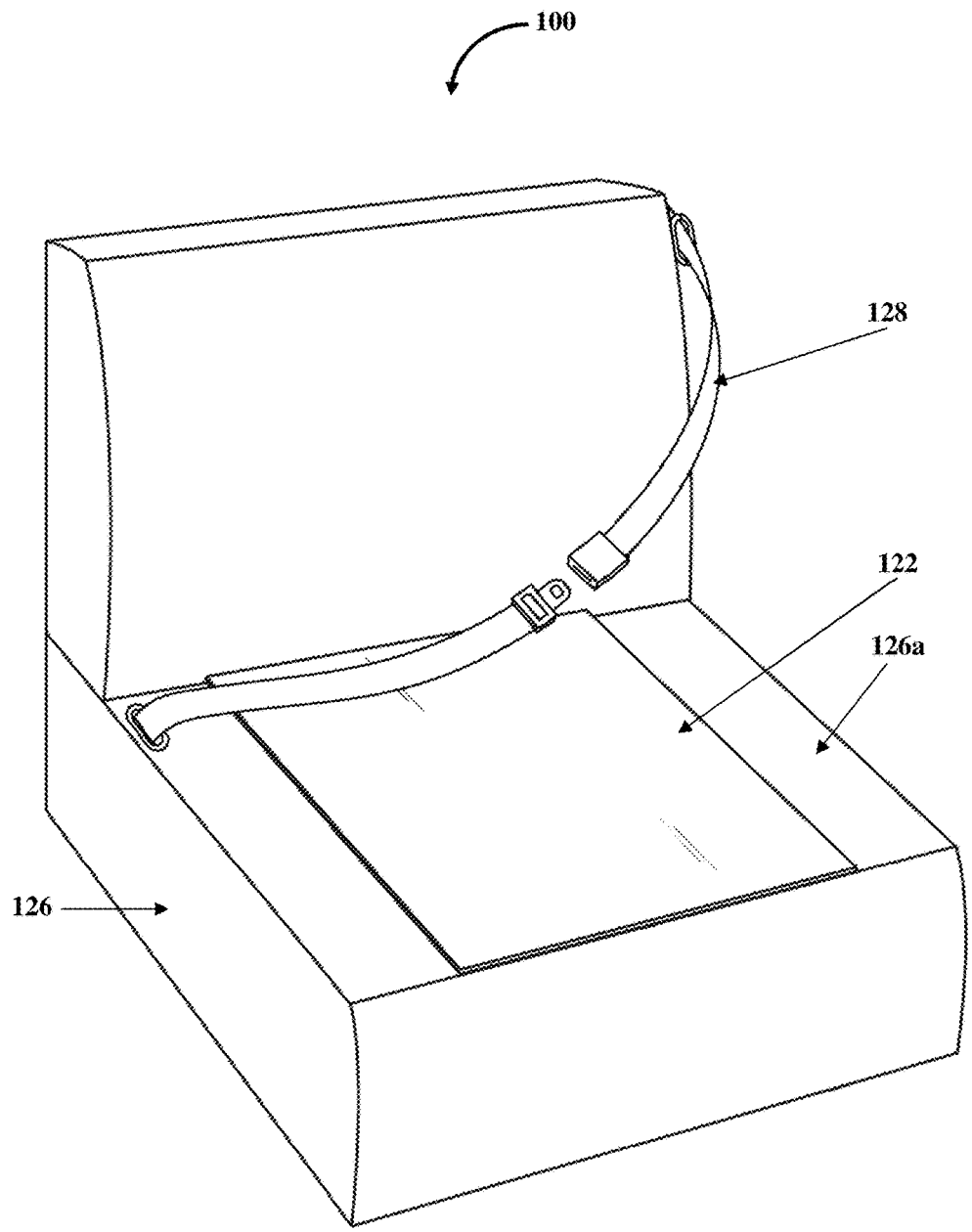
FIG. 2G exemplarily illustrates an assembled isometric view of the concealed toilet in a vehicle seat, showing the toilet seat cover flush against an upper surface of the vehicle seat.

The toilet seat cover 122 exemplarily illustrated in FIG. 2C, is positioned on the primary toilet seat member 118 as exemplarily illustrated in FIG. 2E. The tapered member 124 of the toilet seat cover 122 fits into the 45° tapered inner periphery 118c of the primary toilet seat member 118. The tapered member 124 of the toilet seat cover 122 is angled at 45° and extends downwardly from the lower surface 123b of the concealment layer 123 of the toilet seat cover 122. The concealment layer 123 of the toilet seat cover 122 conforms to the upper surface 126a of the vehicle seat 126 to conceal the toilet 100 in the vehicle seat 126 as exemplarily illustrated in FIG. 2E and FIG. 2G. FIG. 2E exemplarily illustrates an assembled isometric view of the concealed toilet 100 in the vehicle seat 126, showing the toilet seat cover 122 positioned on the vehicle seat 126 to conceal the foundation member 105 along with the flexible container 101 and the primary toilet seat member 118 in the vehicle seat 126. FIG. 2F exemplarily illustrates an assembled left side elevation view of the concealed toilet 100 in the vehicle seat 126. FIG. 2G exemplarily illustrates an assembled isometric view of the concealed toilet 100 in the vehicle seat 126, showing the toilet seat cover 122 flush against the upper surface 126a of the vehicle seat 126. The concealed toilet 100 is positioned in the vehicle seat 126 to facilitate wearing of seat belts 128 of the vehicle seat 126 when the concealed toilet 100 is used by a user. The concealed toilet 100 is therefore portable, leak proof, and hygienic with minimal space requirements and with no complex plumbing and sanitation assemblies, and may be installed below any vehicle seat 126. The concealed toilet 100 can be used privately in a vehicle (not shown), without requiring the user to leave the vehicle.

Figure 3A:
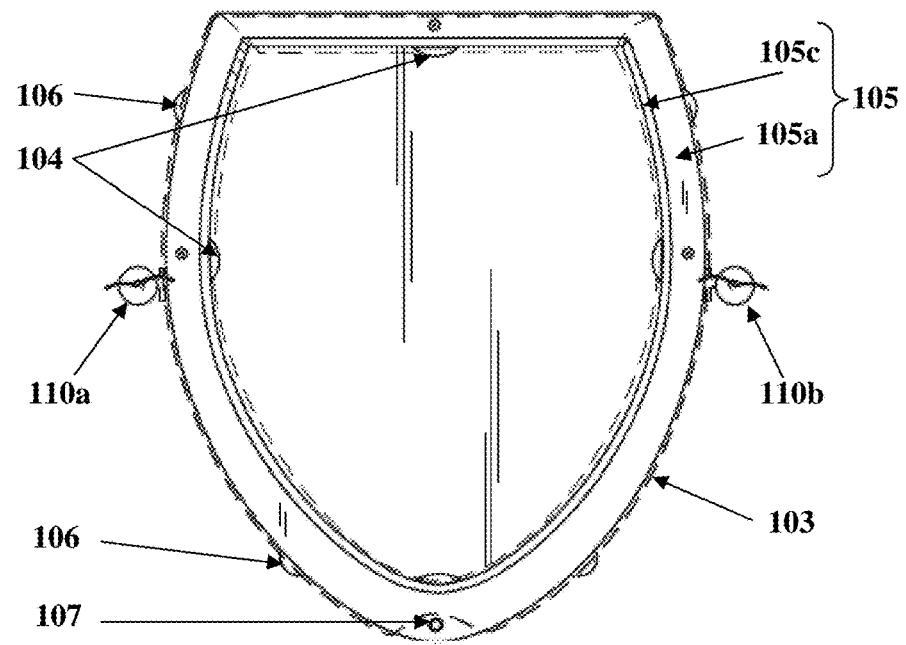
FIG. 3A exemplarily illustrates a top plan view of the foundation member with the flexible container.
Figure 3B:
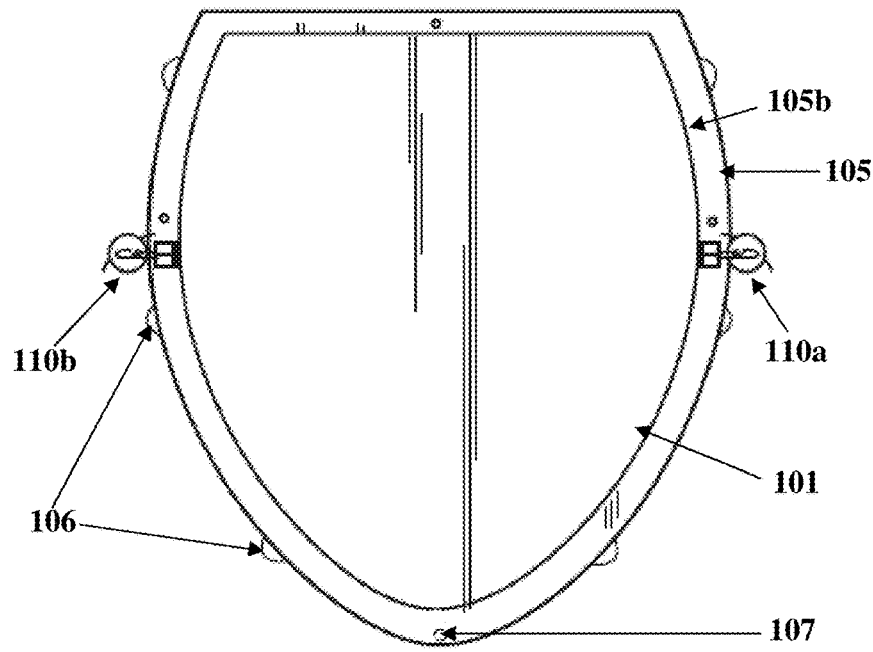
FIG. 3B exemplarily illustrates a bottom view of the foundation member with the flexible container.

FIGS. 3A-3B exemplarily illustrate a top plan view and a bottom view of the foundation member 105 with the flexible container 101. The foundation member 105 is attached to the upper end 101b of the flexible container 101 exemplarily illustrated in FIGS. 1A-1B. In an embodiment, the foundation member 105 is fixed to the flexible container 101, for example, using screws, bolts, rivets, etc. In another embodiment, the foundation member 105 is welded to the flexible container 101.

Figure 4A:
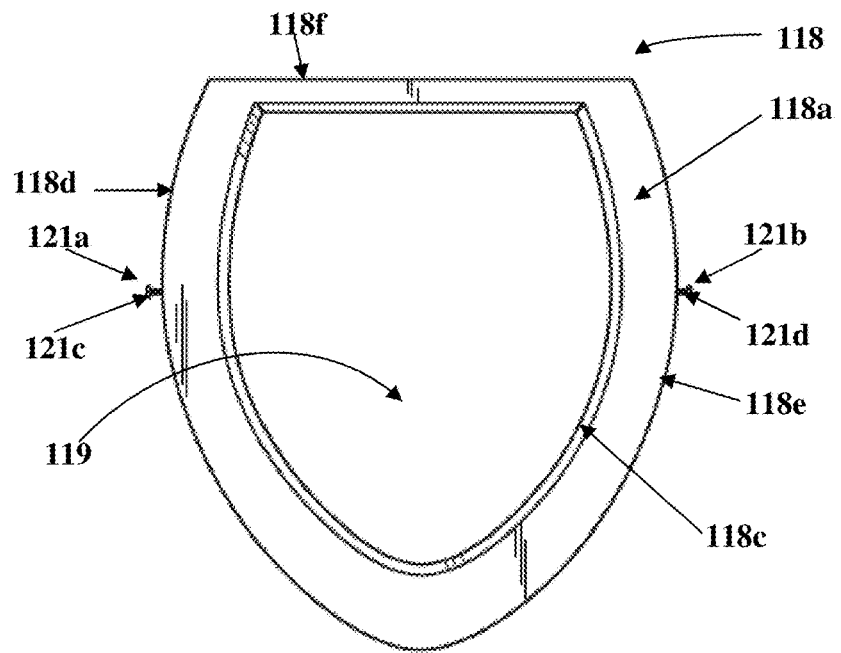
FIG. 4A exemplarily illustrates a top plan view of the primary toilet seat member.
Figure 4B:
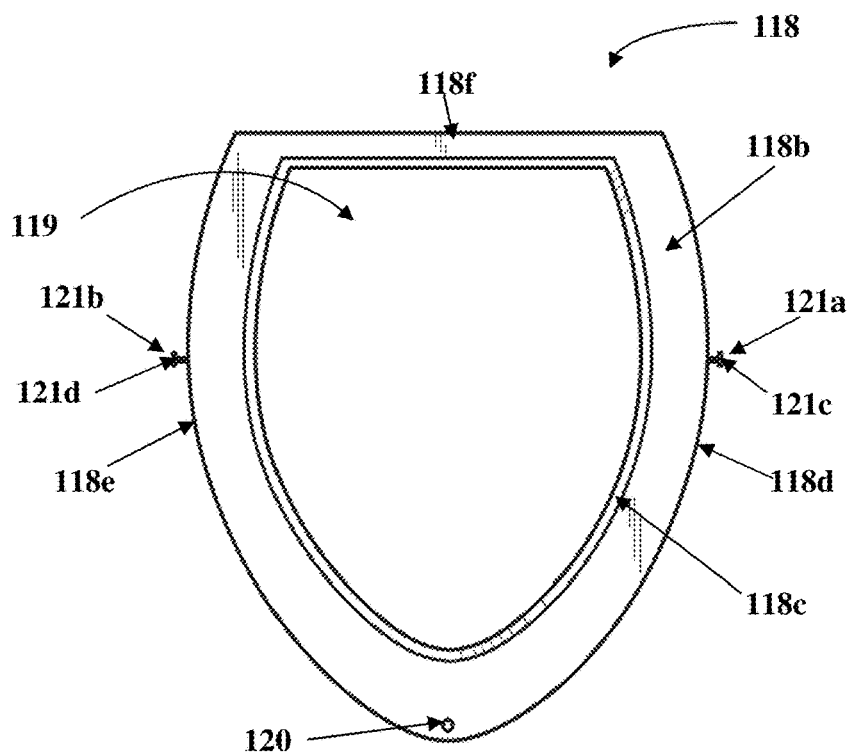
FIG. 4B exemplarily illustrates a bottom view of the primary toilet seat member.

FIGS. 4A-4B exemplarily illustrate a top plan view and a bottom view of the primary toilet seat member 118. The opposing sides 118d and 118e of the primary toilet seat member 118 are, for example, about 2 inches wide. A rear side 118f of the primary toilet seat member 118 is, for example, about 1 inch wide. In an embodiment, the upper surface 118a of the primary toilet seat member 118 is a cushioned surface. The primary toilet seat member 118 defines an opening 119 having a length of, for example, about 9.5 inches and a width of, for example, about 8.5 inches. The bottom view of the primary toilet seat member 118 exemplarily illustrated in FIG. 4B, shows the tapered guide stud 120 of the primary toilet seat member 118. The lock posts 121a and 121b positioned on the opposing sides 118d and 118e of the primary toilet seat member 118 respectively, are exemplarily illustrated in FIGS. 4A-4B.

Figure 5A:
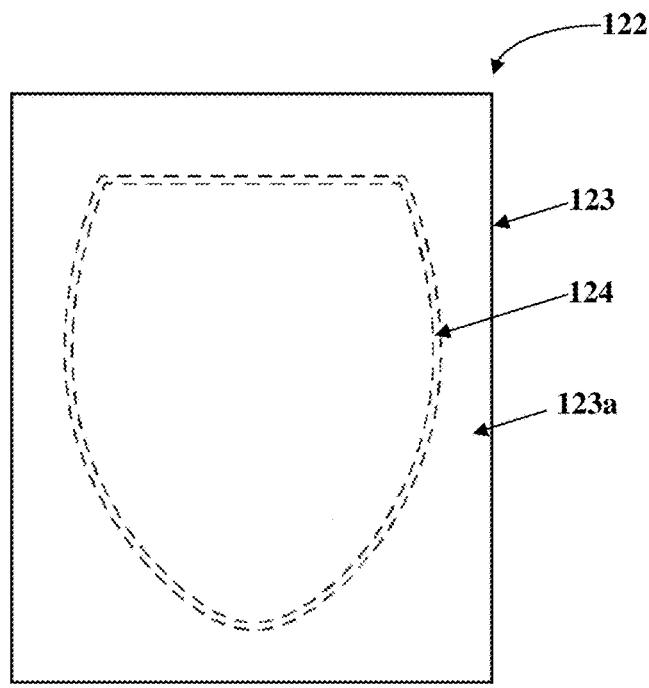
FIG. 5A exemplarily illustrates a top plan view of the toilet seat cover.
Figure 5B:
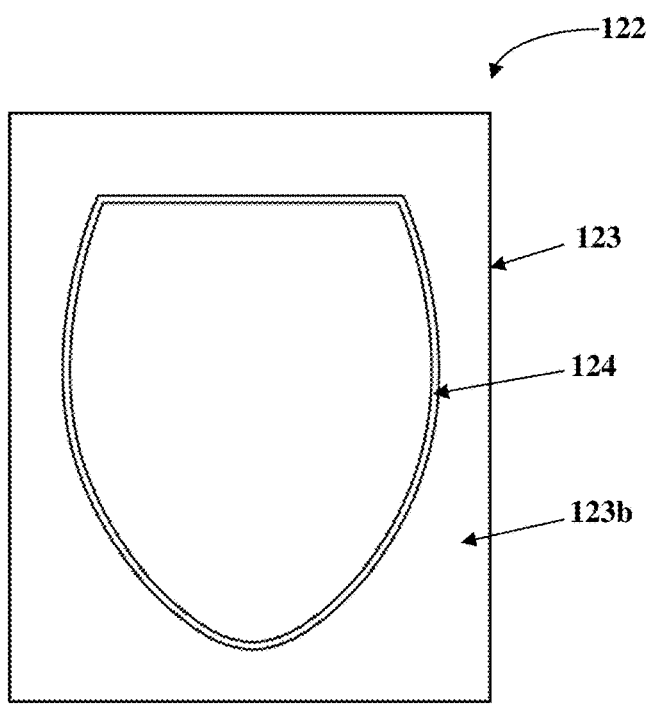
FIG. 5B exemplarily illustrates a bottom view of the toilet seat cover.

FIGS. 5A-5B exemplarily illustrate a top plan view and a bottom view of the toilet seat cover 122. The concealment layer 123 of the toilet seat cover 122 covers the primary toilet seat member 118 by conforming to the vehicle seat 126 as exemplarily illustrated in FIGS. 2E-2G. The tapered member 124 of the toilet seat cover 122 exemplarily illustrated in FIG. 5B, fits into the 45° tapered inner periphery 118c of the primary toilet seat member 118 exemplarily illustrated in FIGS. 4A-4B. In an embodiment, the upper surface 123a of the concealment layer 123 of the toilet seat cover 122 is a cushioned surface.

Figure 6A:
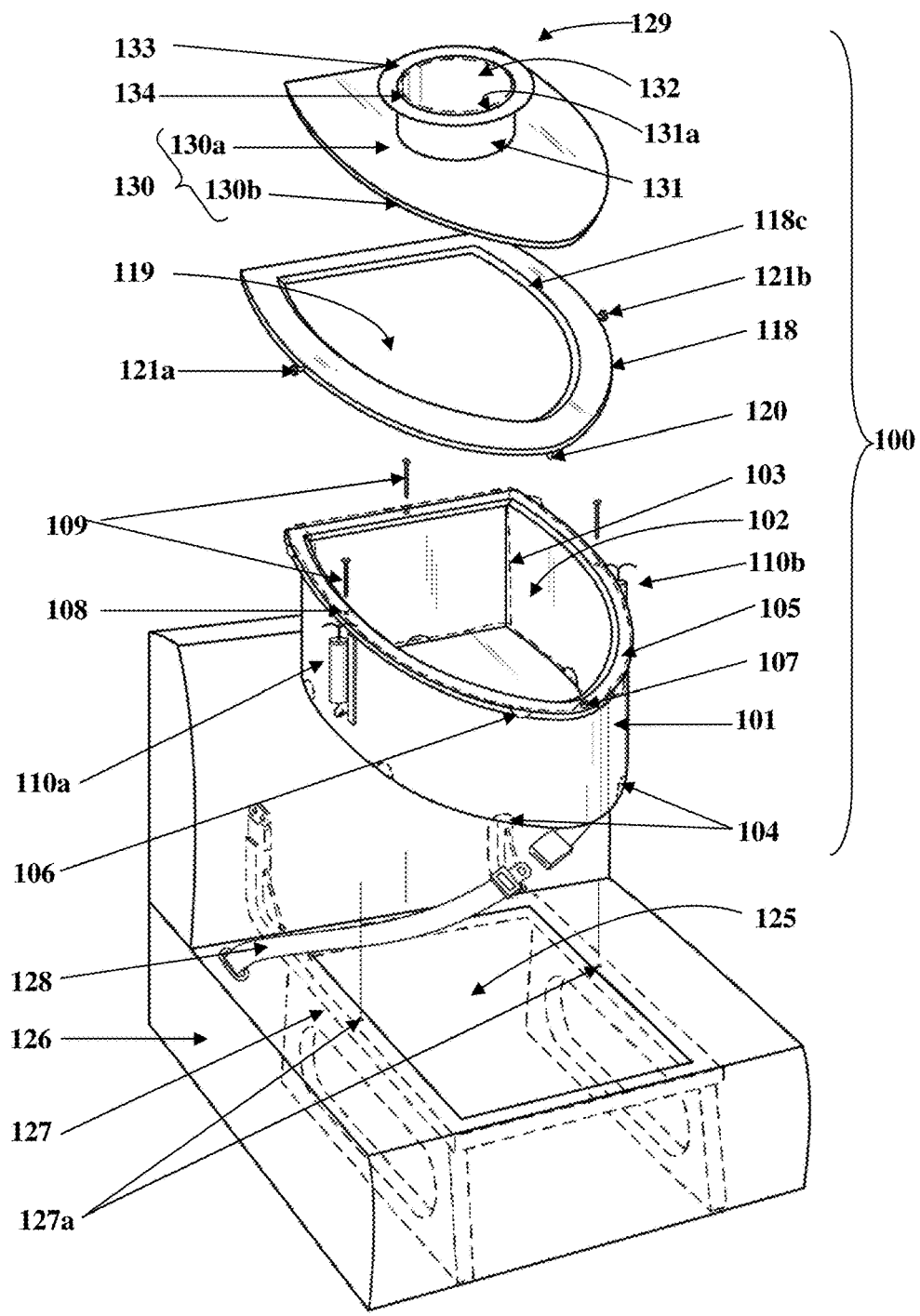
FIG. 6A exemplarily illustrates an exploded isometric view of an embodiment of the concealed toilet in a vehicle seat, showing a secondary toilet seat member for use by a child user.
Figure 6B:
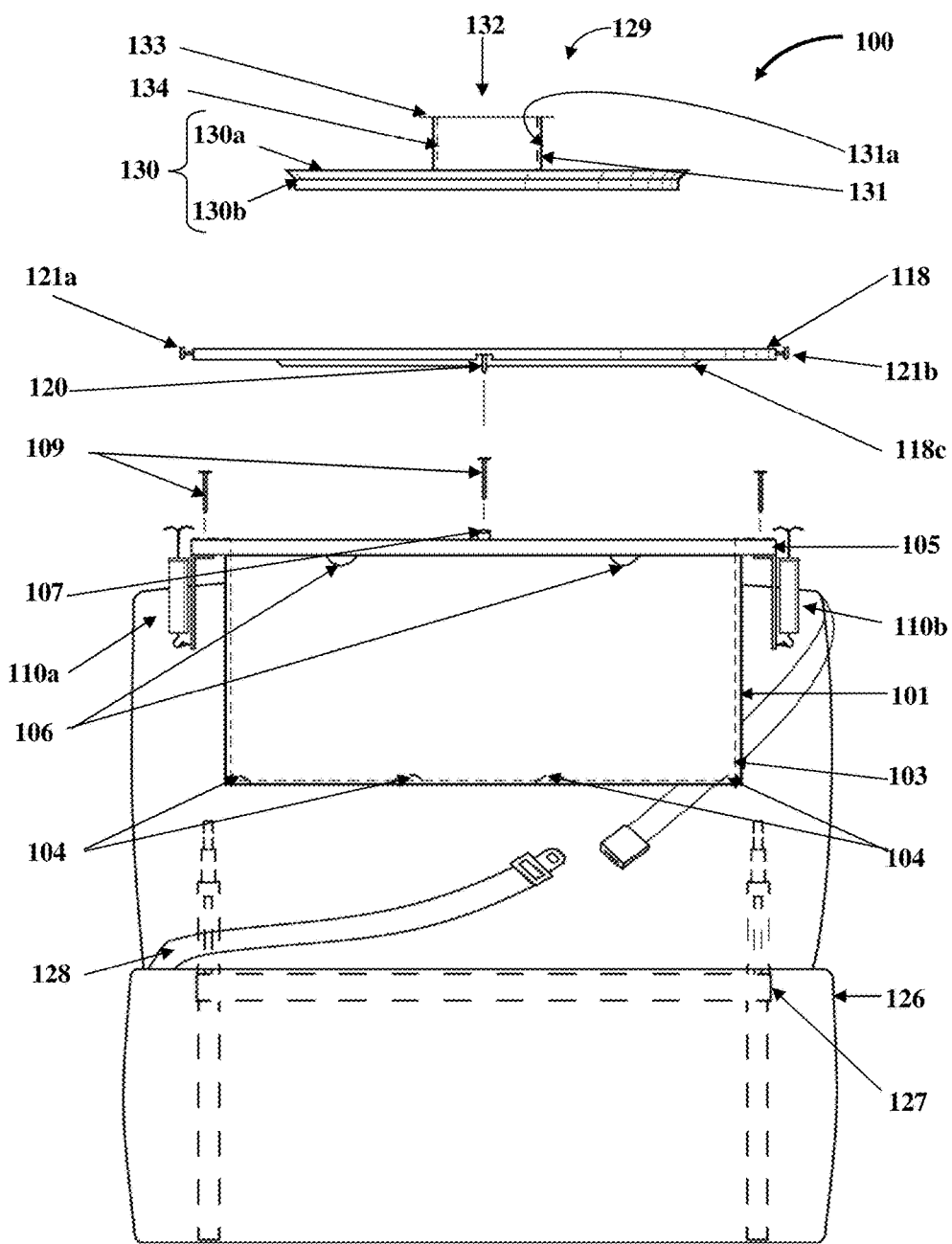
FIG. 6B exemplarily illustrates an exploded front elevation view of the embodiment of the concealed toilet shown in FIG. 6A, in the vehicle seat.

FIGS. 6A-6B exemplarily illustrate an exploded isometric view and an exploded front elevation view of an embodiment of the concealed toilet 100 in a vehicle seat 126, showing a secondary toilet seat member 129 for use by a child user. In this embodiment, in addition to the flexible container 101, the bag fasteners 104, the foundation member 105, the primary toilet seat member 118, and the lock hook assemblies 110a and 110b, the concealed toilet 100 further comprises the secondary toilet seat member 129 that can be used by a child user. The secondary toilet seat member 129 is, for example, made of plastics, metal, composites, etc. The secondary toilet seat member 129 can be carried in a separate carrying bag and positioned in the primary toilet seat member 118 of the concealed toilet 100 as disclosed in the detailed description of FIGS. 7A-7C, when needed by the child user. The secondary toilet seat member 129 comprises a base plate 130 and a sleeve 131. The base plate 130 of the secondary toilet seat member 129 comprises a 45° tapered outer periphery 130b that securely fits within the 45° tapered inner periphery 118c of the primary toilet seat member 118. The thickness of the 45° tapered outer periphery 130b of the base plate 130 is, for example, about 0.25 inches. The overall thickness of the base plate 130 along with the 45° tapered outer periphery 130b is, for example, about 0.75 inches. The sleeve 131 of the secondary toilet seat member 129 extends upwardly from an upper surface 130a of the base plate 130 for receiving sanitary waste from the child user. The sleeve 131 of the secondary toilet seat member 129 comprises a rim 133 defining an opening 132 for receiving the sanitary waste from the child user. The child user may sit on the rim 133 of the sleeve 131 of the secondary toilet seat member 129 for toilet use. In an embodiment, a lining 134 is positioned on inner surfaces 131a of the opening 132 of the sleeve 131 for sanitation purposes. The lining 134 in the sleeve 131 extends in a downward direction into the waste containment bag 103 positioned in the flexible container 101. The lining 134 in the sleeve 131 of the secondary toilet seat member 129 is indicated using dashed lines in FIGS. 6A-8B. The waste containment bag 103 is indicated using dashed lines in FIGS. 6A-7B. In an embodiment, the lining 134 is replaced with a sheet made of, for example, polythene, a synthetic material, etc. The lining 134 is made of stretchable materials, for example, rubber, polythene, plastic, etc., with increased elasticity. The opening 132 of the sleeve 131 is in fluid communication with the waste containment bag 103 in the space 102 defined within the flexible container 101 for transferring the sanitary waste from the child user to the waste containment bag 103.

Figure 7A:
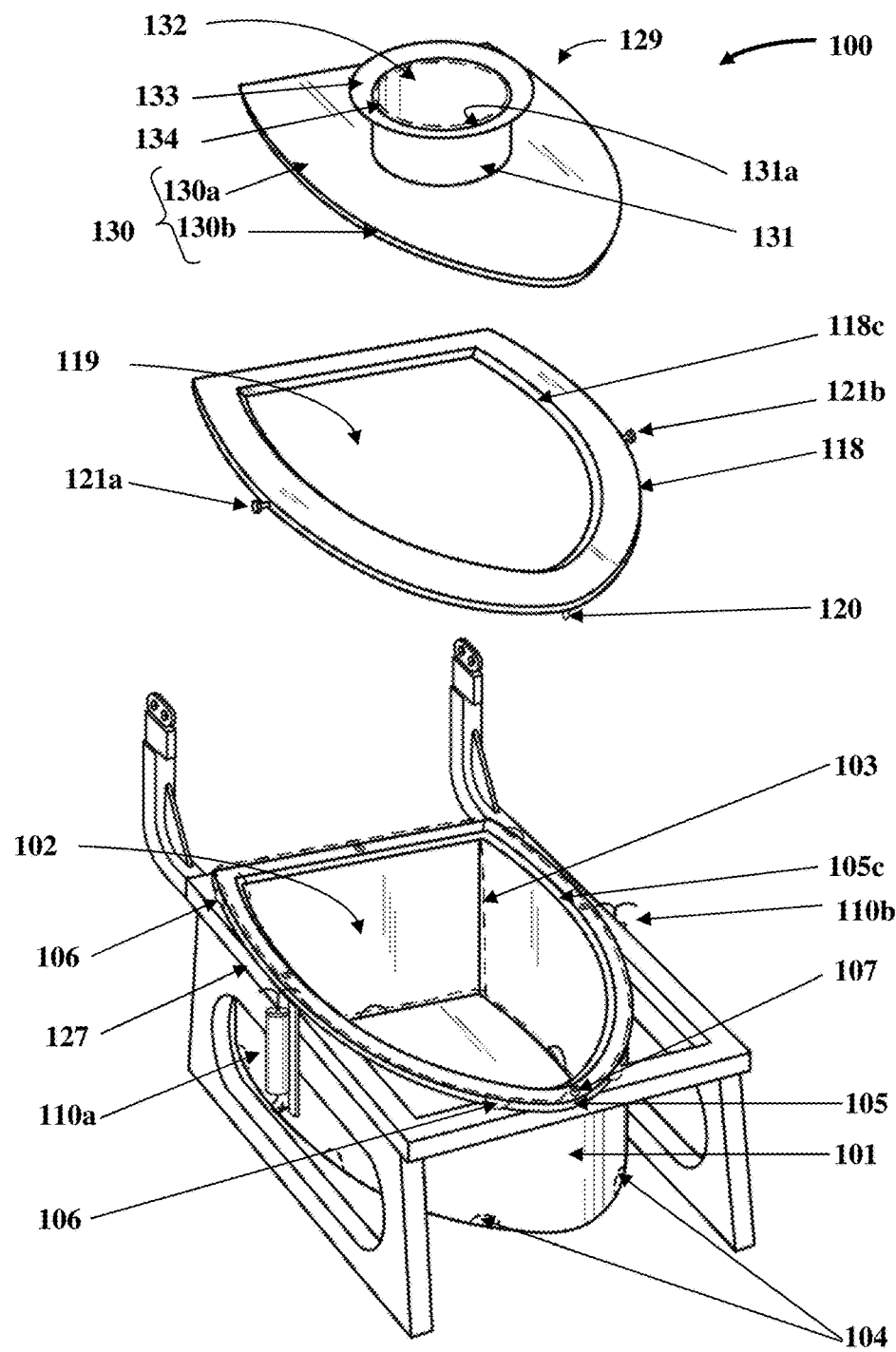
FIG. 7A exemplarily illustrates a partial disassembled isometric view of the embodiment of the concealed toilet shown in FIG. 6A, showing the foundation member along with the flexible container of the concealed toilet fixed to a seat brace of a vehicle seat.
Figure 7B:
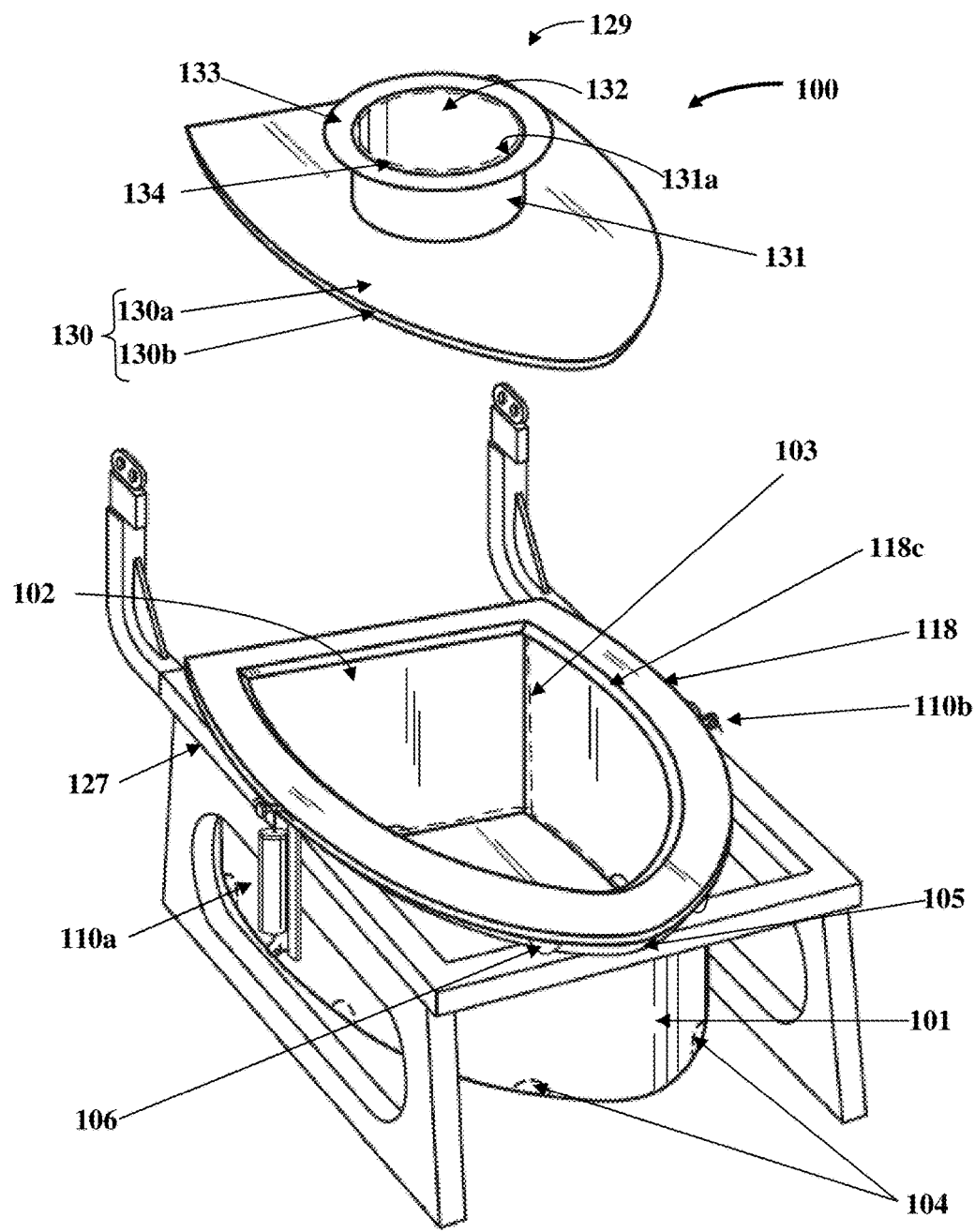
FIG. 7B exemplarily illustrates a partial disassembled view of the embodiment of the concealed toilet shown in FIG. 6A, showing the primary toilet seat member attached to the foundation member.
Figure 7C:
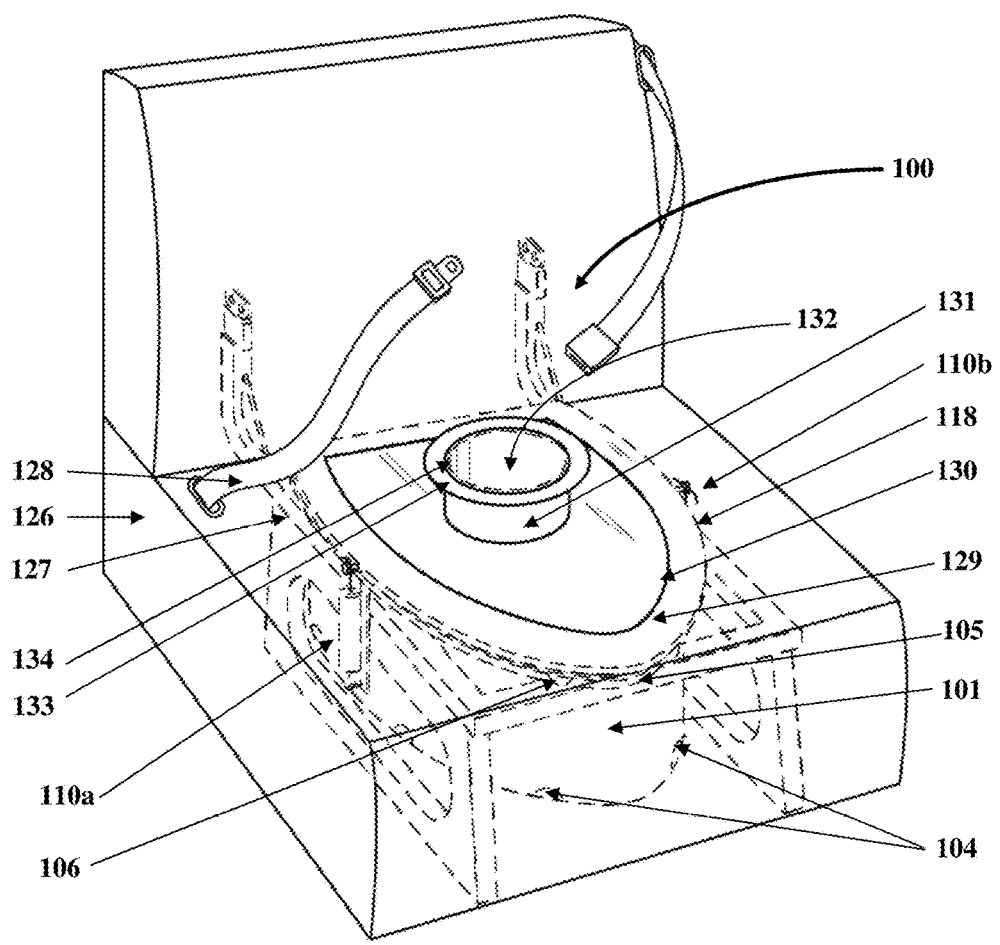
FIG. 7C exemplarily illustrates an assembled isometric view of the embodiment of the concealed toilet shown in FIG. 6A, in a vehicle seat, showing the secondary toilet seat member positioned within an opening defined by the primary toilet seat member for use by a child user.

FIGS. 7A-7C exemplarily illustrate a sequential assembly of the secondary toilet seat member 129 in the vehicle seat 126. The assembly of the foundation member 105 along with flexible container 101 to the seat brace 127 and the detachable attachment of the primary toilet seat member 118 to the foundation member 105 are disclosed in the detailed description of FIGS. 2A-2D. In this embodiment, the toilet seat cover 122 with the concealment layer 123 exemplarily illustrated in FIGS. 2E-2G, is removed from the upper surface 126a of the vehicle seat 126 to expose the primary toilet seat member 118 concealed by the toilet seat cover 122 and to allow positioning of the secondary toilet seat member 129 in the primary toilet seat member 118 for use by a child user. FIG. 7A exemplarily illustrates a partial disassembled isometric view of the embodiment of the concealed toilet 100 shown in FIG. 6A, showing the foundation member 105 along with the flexible container 101 fixed to the seat brace 127. FIG. 7B exemplarily illustrates a partial disassembled view of the embodiment of the concealed toilet 100 shown in FIG. 6A, showing the primary toilet seat member 118 attached to the foundation member 105. The secondary toilet seat member 129 is positioned within the opening 119 defined by the primary toilet seat member 118 for use by the child user.

FIG. 7C exemplarily illustrates an assembled isometric view of the embodiment of the concealed toilet 100 shown in FIG. 6A, in the vehicle seat 126, showing the secondary toilet seat member 129 positioned within the opening 119 exemplarily illustrated in FIG. 7A, defined by the primary toilet seat member 118 for use by the child user. The tapered inner periphery 118c of the primary toilet seat member 118 exemplarily illustrated in FIG. 7B, receives and mates with the tapered outer periphery 130b of the base plate 130 of the secondary toilet seat member 129 exemplarily illustrated in FIG. 7B. The tapered inner periphery 118c of the primary toilet seat member 118 matches with the tapered outer periphery 130b of the base plate 130 of the secondary toilet seat member 129 to allow the secondary toilet seat member 129 to be positioned and fit into the primary toilet seat member 118. As exemplarily illustrated in FIG. 6B, the tapered outer periphery 130b of the base plate 130 of the secondary toilet seat member 129 is substantially similar in construction to the tapered member 124 of the toilet seat cover 122 exemplarily illustrated in FIG. 1B. The 0.25 inch taper of the secondary toilet seat member 129 mates with the 0.25 inch taper in the primary toilet seat member 118 for fitting the secondary toilet seat member 129 into the primary toilet seat member 118. The additional 0.5 inch extension of the tapered outer periphery 130b of the base plate 130 of the secondary toilet seat member 129 matches the offset in the primary toilet seat member 118.

Figure 8A:
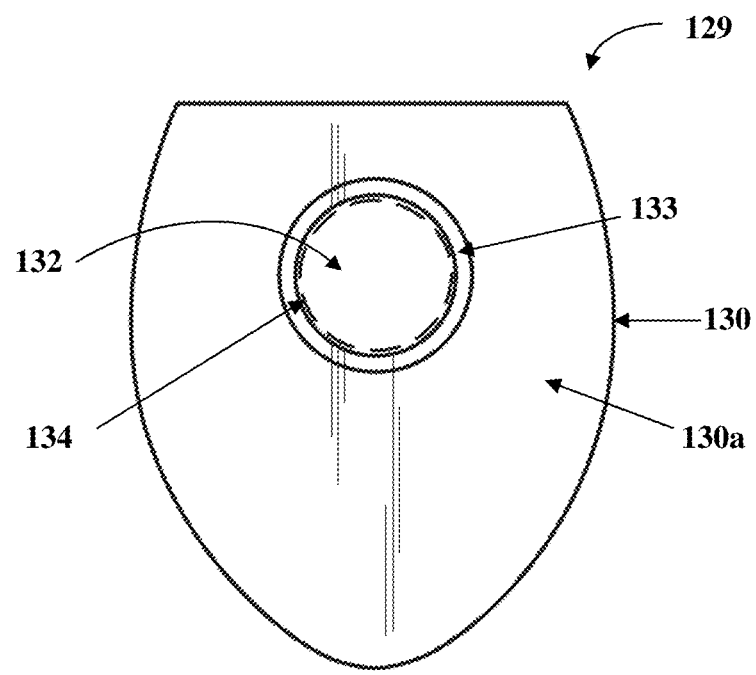
FIG. 8A exemplarily illustrates a top plan view of the secondary toilet seat member.
Figure 8B:
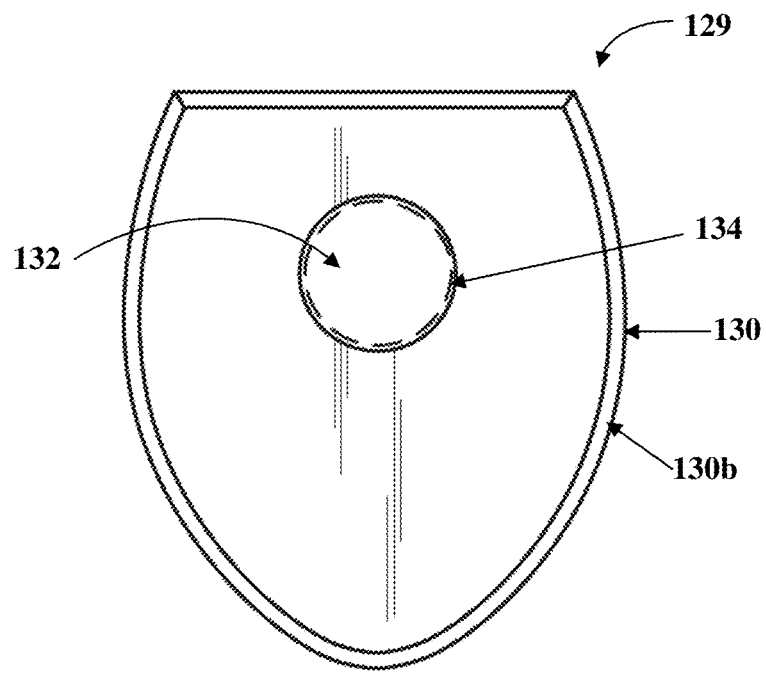
FIG. 8B exemplarily illustrates a bottom view of the secondary toilet seat member.

FIGS. 8A-8B exemplarily illustrate a top plan view and a bottom view of the secondary toilet seat member 129. In an embodiment, the upper surface 130a of the base plate 130 of the secondary toilet seat member 129 is a cushioned surface. The lining 134 is provided in the sleeve 131 of the secondary toilet seat member 129 for sanitary and hygienic purposes and extends into the waste containment bag 103 in the flexible container 101 exemplarily illustrated in FIGS. 1A-1B.

In an embodiment, accessories for use with the concealed toilet 100, for example, a closable hand held urinal, toilet tissues, and additional waste containment bags can be carried within a carrying bag that contains the secondary toilet seat member 129. A space (not shown) may be provided between the concealed toilet 100 and the seat brace 127 of the vehicle seat 126 in the vehicle (not shown) to accommodate the used waste containment bag 103 to carry the waste containment bag 103 to a disposal site. In an embodiment, a clean shied (not shown) that conforms to the vehicle seat 126 is positioned behind the concealed toilet 100. The clean shield is in the form of an "L" shape. The clean shield is, for example, a plastic sheet that is provided in the vehicle for sanitary and hygienic purposes. The height of the clean shield is, for example, about 6 inches and the width of the clean shield is substantially the same as that of the primary toilet seat member 118. The concealed toilet 100 disclosed herein is configured to adapt to multiple seats in the vehicle, for example, a front seat, a rear seat, etc. The concealed toilet 100 can be used by persons of all ages with different physical attributes. Furthermore, the concealed toilet 100 is adaptable to any standard size seat on any means of transportation with a few alterations.

The foregoing examples have been provided merely for the purpose of explanation and are in no way to be construed as limiting of the concealed toilet 100 disclosed herein. While the concealed toilet 100 has been described with reference to various embodiments, it is understood that the words, which have been used herein, are words of description and illustration, rather than words of limitation. Furthermore, although the concealed toilet 100 has been described herein with reference to particular means, materials, and embodiments, the concealed toilet 100 is not intended to be limited to the particulars disclosed herein;

rather, the concealed toilet 100 extends to all functionally equivalent structures, methods and uses, such as are within the scope of the appended claims. Those skilled in the art, having the benefit of the teachings of this specification, may effect numerous modifications thereto and changes may be made without departing from the scope and spirit of the concealed toilet 100 disclosed herein in its aspects.

I claim:

1. A concealed toilet in a vehicle seat, said concealed toilet comprising:
   a flexible container positioned in a cavity in said vehicle seat, wherein said flexible container accommodates a waste containment bag within a space defined within said flexible container;
   a foundation member attached to and protruding from an upper end of said flexible container for securing said flexible container to a seat brace of said vehicle seat;
   a primary toilet seat member detachably attached to an upper surface of said foundation member, wherein said primary toilet seat member comprises lock posts extending outwardly from opposing sides of said primary toilet seat member;
   lock hook assemblies fixedly attached to opposing sides of said foundation member, wherein each of said lock hook assemblies comprises a lock post hook and a finger hook extending from an upper end of a spring, and wherein said finger hook facilitates engagement of said lock post hook with said lock post for securing said primary toilet seat member to said foundation member; and
   a toilet seat cover comprising a concealment layer positioned on said primary toilet seat member for concealing said waste containment bag in said flexible container.

2. The concealed toilet of claim 1, further comprising a plurality of bag fasteners fixed at predetermined locations on inner surfaces of said flexible container for securing said waste containment bag to said inner surfaces of said flexible container within said space of said flexible container.

3. The concealed toilet of claim 1, wherein said foundation member comprises:
   a tapered inner periphery for receiving and mating with a tapered inner periphery of said primary toilet seat member;
   a plurality of bag holders extending outwardly from said opposing sides of said foundation member for holding an upper portion of said waste containment bag that extends over said opposing sides of said foundation member;
   an elevated bag diverter extending from said upper surface of said foundation member for diverting said upper portion of said waste containing bag for preventing rupture of said waste containment bag; and
   mounting holes positioned on said upper surface of said foundation member for accommodating fastening elements that secure said foundation member to said seat brace.

4. The concealed toilet of claim 3, wherein said primary toilet seat member further comprises a tapered guide stud extending downwardly from a lower surface of said primary toilet seat member for engaging with a hole defined in said elevated bag diverter of said foundation member.

5. The concealed toilet of claim 1, wherein each of said lock hook assemblies further comprises:
   a support structure fixedly attached to a corresponding one of said opposing sides of said foundation member;
   a pipe fixedly attached to said support structure; and
   said spring accommodated in a space defined within said pipe, wherein a lower end of said spring is connected to said support structure.

6. The concealed toilet of claim 5, wherein said each of said lock hook assemblies further comprises a spring stop positioned on an upper end of said pipe for precluding said spring from extending outwards of said pipe by resisting tension developed in said spring when said spring is pulled.

7. The concealed toilet of claim 1, wherein said toilet seat cover further comprises a tapered member extending downwardly from a lower surface of said concealment layer to mate with and fit into a tapered inner periphery of said primary toilet seat member.

8. The concealed toilet of claim 1, further comprising a secondary toilet seat member positioned within an opening defined by said primary toilet seat member, for use by a child user on removal of said toilet seat cover from said primary toilet seat member, wherein said secondary toilet seat member comprises:
   a base plate with a tapered outer periphery that securely fits within a tapered inner periphery of said primary toilet seat member; and
   a sleeve comprising an opening extending upwardly from an upper surface of said base plate for receiving sanitary waste from said child user, wherein said opening of said sleeve is in fluid communication with said waste containment bag in said space defined within said flexible container for transferring said sanitary waste from said child user to said waste containment bag.

9. The concealed toilet of claim 8, further comprising a lining positioned on inner surfaces of said opening of said sleeve of said secondary toilet seat member for sanitation purposes.

10. The concealed toilet of claim 1, wherein upper surfaces of said primary toilet seat member and said toilet seat cover are cushioned surfaces.

* * * * *